United States Patent [19]
Lee

[11] Patent Number: 5,587,822
[45] Date of Patent: Dec. 24, 1996

[54] LIQUID CRYSTAL ORIENTATION CONTROL LAYER METHOD AND APPARATUS FOR MANUFACTURING THE SAME AND MASK FOR USE IN THE MANUFACTURING

[75] Inventor: Jae-won Lee, Seoul, Rep. of Korea

[73] Assignee: Samsung Electronics Co., Ltd., Suwon, Rep. of Korea

[21] Appl. No.: 380,862

[22] Filed: Jan. 30, 1995

[30] Foreign Application Priority Data

Jan. 28, 1994 [KR] Rep. of Korea .................. 94-1586

[51] Int. Cl.⁶ .................................................. G02F 1/1337
[52] U.S. Cl. ................................................... 349/124
[58] Field of Search ................................. 359/75, 76, 77

[56] References Cited

FOREIGN PATENT DOCUMENTS

| | | | |
|---|---|---|---|
| 56-19030 | 2/1981 | Japan | 359/76 |
| 1243024 | 9/1989 | Japan | 359/75 |
| 5224206 | 9/1993 | Japan | 359/75 |
| 61-303389 | 5/1994 | Japan | 359/75 |
| 61-30390 | 5/1994 | Japan | 359/75 |

*Primary Examiner*—William L. Sikes
*Assistant Examiner*—James A. Dudek
*Attorney, Agent, or Firm*—Pillsbury Madison & Sutro LLP; Cushman Darby & Cushman, IP Group

[57] ABSTRACT

An orientation layer for orientating liquid crystal uniformly, a method and apparatus for manufacturing the same, and a method for manufacturing a mask in the manufacturing apparatus has advantages in that, static electricity is not generated by ablating the coated polyimide using the mask having a hemicircular microlens array for focusing the parallel beams of an excimer laser into striped beams, so that a static-sensitive device is not damaged. Also, since the pulse wave having a short wavelength is used as a light source, the manufacturing process is fast, thereby improving productivity. Further, the same manufacturing process is repeatedly performed on a substrate without limitation in the substrate size, making the process applicable to very large substrates. In addition, since the hemicircular microlens of a mask can be variably designed and manufactured, the depth and width of grooves of the orientation layer can be easily adjusted. Also, when manufacturing the orientation layer by tilting the substrate or overlaying polyimide on the manufactured orientation layer, the depth and width of the grooves can be easily controlled.

4 Claims, 4 Drawing Sheets

LIQUID CRYSTAL ORIENTATION CONTROL LAYER METHOD AND APPARATUS FOR MANUFACTURING THE SAME AND MASK FOR USE IN THE MANUFACTURING

BACKGROUND OF THE INVENTION

The present invention relates to a liquid crystal display device, and more particularly, to a liquid crystals orientation control layer for orientating liquid crystal uniformly, a method and apparatus for manufacturing the same, and a method for manufacturing a mask for use in the manufacturing apparatus.

In the operation of a liquid crystal display device, the liquid crystal material should be orientated as desired. Thus, it is imperative to control the orientation of the liquid crystal, which is accomplished by a liquid crystal orientation control layer (to be called hereinafter an "orientation layer"). The mechanism by which liquid crystal is orientated is not yet known exactly, but empirically, there have been known methods for depositing a silicon oxide layer on a substrate with a tilt or for forming the grated surface of a substrate. Particularly, in 1911, it was discovered that when a glass surface is rubbed with paper in a predetermined direction, the long axes of the liquid crystal molecules are orientated along the rubbing direction. Since then, a method for rubbing an organic layer made of a polyimide or the like has been widely used, thereby allowing mass-production of liquid crystal display devices.

FIG. 1 is a cross-sectional view of a conventional orientation layer and shows that a polyimide orientation layer 2 having a uniformly grooved surface is formed on a substrate 1 such that liquid crystal molecules 3 are orientated in a predetermined direction. In this method, an orientation layer made of polymer or organic material is deposited on the substrate 1 and then the surface thereof is rubbed in a predetermined direction with cotton or a cloth, which is advantageous in view of production of large layers and uniform layers. Thus, this method is more widely used than the method for depositing silicon oxide layer with a tilt.

As shown in FIG. 2, a rotary roller 5 with a cloth 4 (e.g., nylon or rayon) fixed on the surface thereof is rolled over the substrate 1 on which the polyimide orientation layer 2 is coated, with a constant power, thereby forming grooves.

However, such an orientation layer forming method by the rubbing treatment is liable to generate static electricity due to the friction produced when the rotary roller 5 rotates while in close contact with the surface of the substrate 1. Thus, if a thin-film transistor or similar device which is sensitive to the static electricity is disposed beneath the polyimide orientation layer 2, the device is easily damaged.

Currently, in order to solve this problem, there is a method for neutralizing the static electricity by supplying ionized air having the opposite polarity with respect to the rotary roller. However, since the air cannot be supplied in amounts sufficient to counteract the high voltages which are instantaneously generated, the production of inferior devices is unavoidable.

Also, there is a disadvantage in that the grooves are not formed uniformly. Since grooves having a severe tilt are difficult to form by rubbing, it is difficult to increase a liquid crystal pre-tilt angle. Specifically, the pre-tilt angle is an important factor for determining picture quality. Therefore, it is essential to regulate the pre-tilt angle.

SUMMARY OF THE INVENTION

To solve the above-described problems, it is an object of the present invention to provide an orientation layer whose groove tilt angle is adjusted, whereby static electricity is not generated while forming grooves on the surface of the orientation layer and the pre-tilt angle of liquid crystal is desirably adjusted, and the method for manufacturing the same.

Also, it is another object of the present invention to provide an orientation layer manufacturing apparatus for implementing the orientation layer whose groove angle is adjusted so as to control the liquid crystal pre-tilt angle, on a large substrate, and a method for manufacturing a mask for the apparatus.

To accomplish the above object, the orientation layers according to the present invention are characterized in that a plurality of orientation layers are formed in parallel with predetermined thickness and width at a predetermined distance on the internal surface of the substrate with which liquid crystal contacts, whose side surface is perpendicular to the substrate surface.

Also, the apparatus for manufacturing the orientation layer comprises: a light source for orientation-treatment of an orientation layer; an optical system for collimating the light emitted from the light source; and a mask having a lens array wherein a plurality of hemicircular microlenses having a predetermined diameter for focusing the collimated light from the optical system in a striped pattern are aligned in parallel.

Also, the method for manufacturing a mask for forming the orientation layer comprises the steps of: forming a predetermined metal pattern on a transparent substrate in a striped pattern; forming a plurality of hemicircular metal patterns in parallel by heating rectangular metal patterns formed on the substrate in the metal pattern forming step in a predetermined temperature, simultaneously irradiating the metal patterns to be molten with a light having a predetermined energy per unit space and cooling the metal patterns; forming a hemicircular microlens array formed of a compact oxide layer from the substrate processed in the metal pattern forming step, by oxidizing the metal patterns using an anode oxidation method; forming a light-blocking layer between the microlenses formed in the oxidizing step by coating a highly reflective material using a thin film forming method; and forming an anti-reflection coating layer on an opposing plane of the substrate whereon the light-blocking layer is formed.

The method for forming the orientation layer using the orientation layer manufacturing apparatus comprises the steps of: coating an orientation material in a predetermined thickness on a transparent substrate; and forming an orientation layer such that a plurality of striped layers are formed in parallel at a predetermined distance by evaporating the exposed portion of the coated orientation layer by focusing the striped light from the hemicircular microlens array on the coated orientation layer.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The primary factors influencing the characteristics of the orientation layer according to the present invention are the manufacture of a dielectric hemicircular microlens array whose curvature radii can be adjusted and the manufacture of grooves having a width of 1 μm or below uniformly on the polyimide coated on the surface of a substrate as thinly as 1000 Å or below using the lens array.

Figure 1:
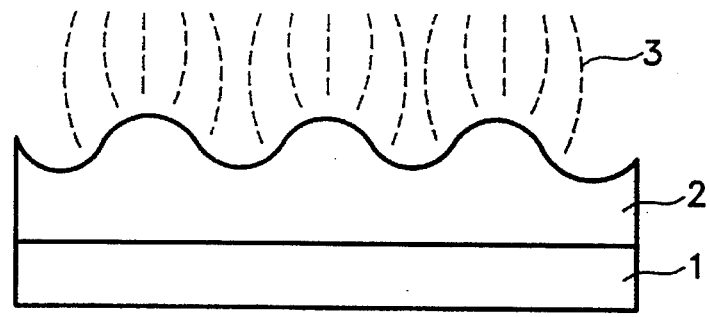
FIG. 1 is a cross-sectional view of a conventional orientation layer.
Figure 2:
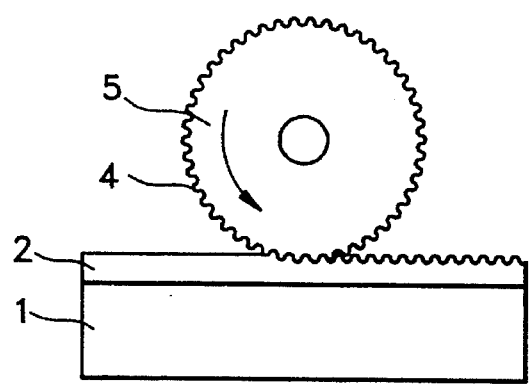
FIG. 2 shows a manufacturing process of a conventional orientation layer of FIG. 1.
Figure 3:
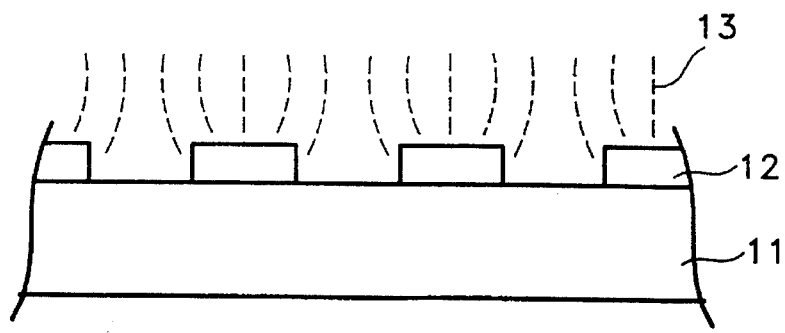
FIG. 3 is a cross-sectional view of an orientation layer according to the present invention.

As shown in FIG. 3, the orientation layer 12 according to the present invention is formed on the substrate 11 in a striped pattern whose side surfaces are nearly perpendicular so that a pre-tilt angle, which is an important factor for determining picture quality of a liquid crystal display device, can be increased.

Figure 4:
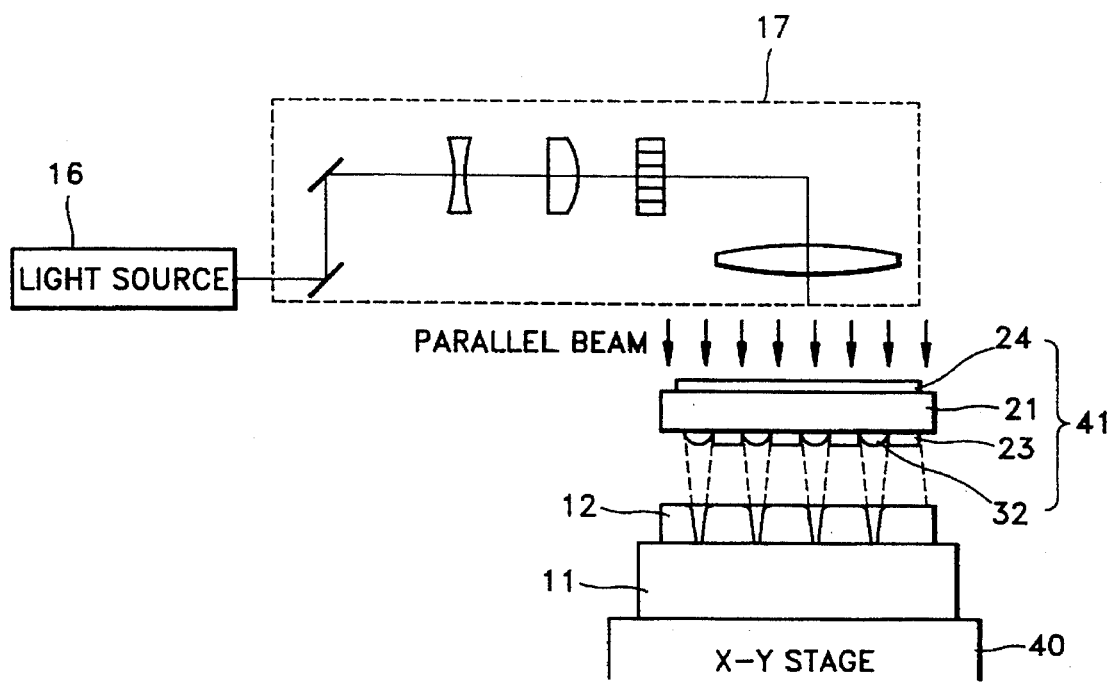
FIG. 4 is a schematic diagram of the orientation layer manufacturing apparatus according to the present invention.

As shown in FIG. 4, the apparatus for forming the orientation layer having the aforementioned configuration includes a light source 16 such as an excimer laser of a short wavelength pulse used as a means for decomposing polyimide coated as the orientation layer, a beam delivery optic system 17 for making the excimer laser beam into collimated beams, a mask 41 having hemicircular microlenses 32 attached as an array and located close to the polyimide-coated substrate 11 for focusing the parallel excimer laser beams in the form of a plurality of stripes so as to remove the polyimide 12 from a desired portion, and an electrically driven X-Y stage 40 for transferring the substrates along the process.

An excimer laser emitting a short wavelength pulse most often adopts XeCl (λ=308 nm) or KrF (λ=248 nm), both of which have a long life and generate a high output. However, ArF (λ=193 nm) can be used according to characteristics of polyimide. However, shorter wavelength excimer lasers have a relative short gas life span and result in uneconomical production, cost increases and low light efficiency. Thus, the XeCl excimer laser is the most advantageous to use.

Beam delivery optic system 17 functions to homogenize the excimer laser beams spatially and then transmit them to mask 24 and includes a mirror, a homogenizer and a lens.

Mask is composed of a hemicircular microlens array 32 for focusing laser beams in the shape of a plurality of stripes having a width of 1 μm or below, a light-blocking layer 23 made of a metal or dielectric laminated layer, for blocking the beam between microlenses, and an anti-reflection layer 24, which are formed on a transparent quartz substrate 21.

Next, the orientation layer manufacturing method will be described.

In order to drive the liquid crystal display device via an applied electrical field in accordance with a desired pattern, the liquid crystal molecules should be orientated in a constant shape, which is called orientation. It is known that the orientation is chiefly attributed to physicochemical bonds (e.g., hydrogen bonds or van der Waals bonds) between the substrate and liquid crystal molecules, mechanical bonds between the liquid crystal molecules themselves, and the shape and anisotropic elasticity of a substrate.

According to experimental results, for liquid crystal orientation, the contour of an orientation layer surface should be controlled with great precision. Specifically, it is effective to form furrows or grooves on the surface of a polyimide orientation layer. In order to form such grooves, the excimer laser beams selectively irradiate the uniformly coated polyimide 12, thereby causing an ablation whereby the internal bond of the irradiated polyimide molecules is instantaneously cut so that the molecules are vaporized. Thus, a polyimide orientation layer is formed, as shown in FIG. 4. The width of a groove is preferably 2 μm or below and the distance (spacing) between grooves is generally 5 μm or below. However, these factors vary depending on the thickness of the liquid crystal layer cell gap, the type of liquid crystal being employed and the driving method, so that they cannot be unconditionally determined.

To form regular grooves having a minute width, the excimer laser beams are made spatially uniform. As shown in FIG. 4, and mask 41 is positioned near the upper surface of substrate 21 so that the excimer laser beams reach substrate 21 in the form of parallel beams.

Figure 10:
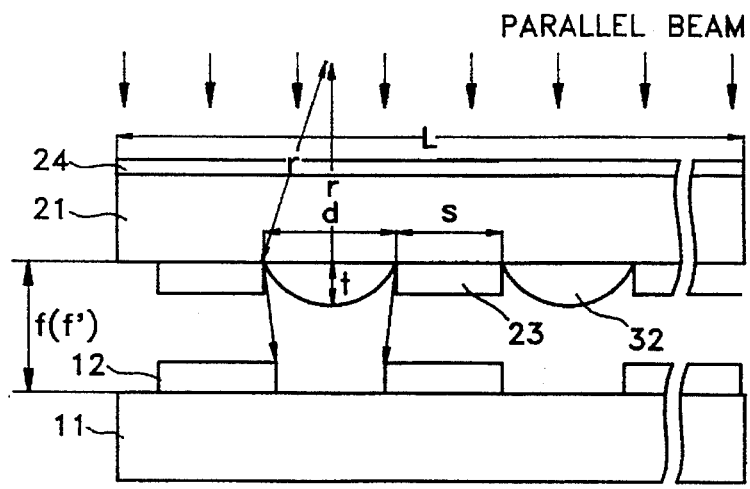
FIG. 10 shows a structure of a hemicircular microlens array.

As shown in FIG. 10, mask is formed by drilling the quartz substrate for transmitting the excimer laser beams with an optical precision and has hemicircular microlens array 32 having a curvature radius r, a refractive index n, a height t, a width d, a length L, a spacing s and a focal distance f; and a light-blocking layer 23 of the same width, length and spacing on its surface which is disposed between the lenses of the array and not overlapping the lenses. Parts of the excimer laser beam having reached the mask through beam delivery optic system 17 are reflected by light-blocking layer 23 on the opposite plane of mask and are transmitted only via areas having no light-blocking layer. The excimer laser beams are focused in a striped pattern via hemicircular microlens array 32 between the patterns of the light-blocking layer 23. Since the focused beams has the smallest width at a focal distance f, if an orientation-layer-coated substrate is installed at a position where the distance f' from the lens becomes the same as the focal distance f, only the polyimide 12 of the portion irradiated by the beams focused by the lens array are selectively removed, to thus form an orientation layer as shown in FIG. 3.

Meanwhile, as the method for manufacturing a hemicircular microlens array on the quartz substrate whose surface is drilled with optical-level precision, an ion exchange method, a silicon thermal oxidized layer method and a photolithographic etching method can be adopted. However, in the present invention, as shown in FIGS. 5 to 9, a metal oxidizing method is adopted.

The method for manufacturing a mask of a hemicircular microlens array by the metal oxidation will now be described.

Figure 5:
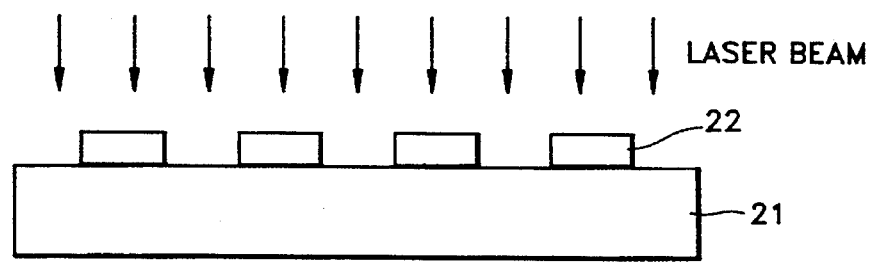
FIGS. 5 to 9 show a mask manufacturing process adopted in the orientation layer manufacturing process.
Figure 6:
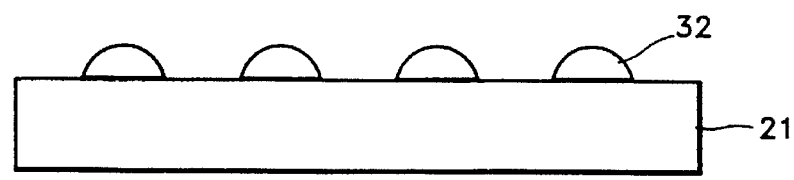
Figure 7:
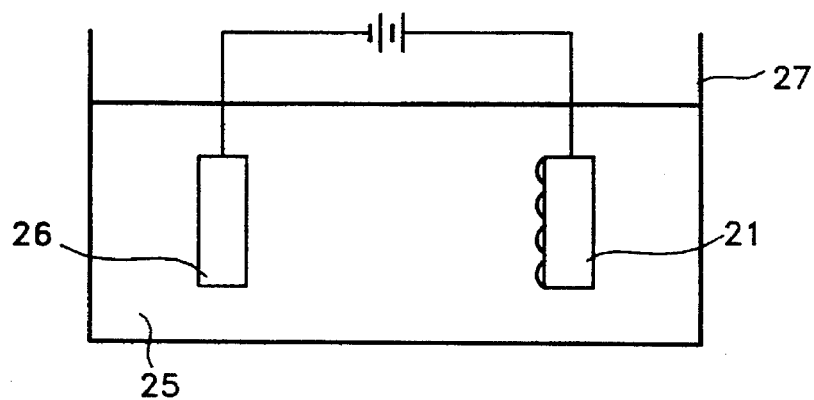
Figure 8:
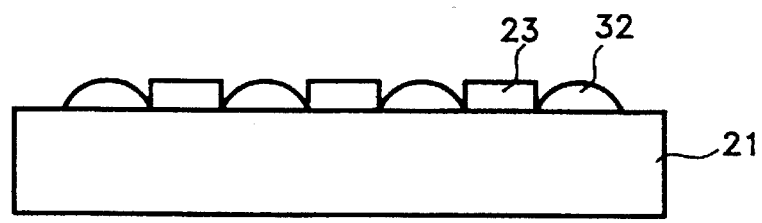
Figure 9:
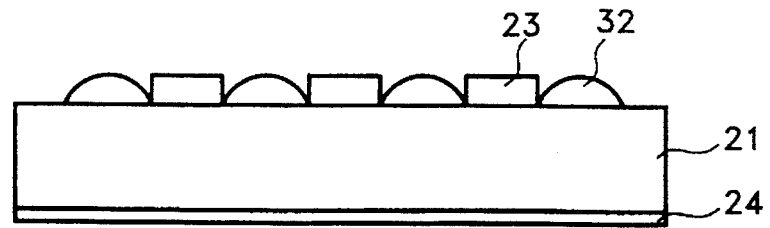

Since the overall volume of aluminum (Al) increases after anode-oxidation, a rectangular aluminum pattern 22 having smaller dimensions than those of a desired sized microlens is manufactured by a conventional deposition method and photolithographic etching method. Thereafter, while heating substrate 21 to 200°~600° C., the excimer laser beam is emitted with the energy of 1~10 joules/cm$^2$ as shown in FIG. 5, whereby the aluminum is melted. Then, a hemicircular lens is formed by the surface tension due to the solidified aluminum as shown in FIG. 6. As shown in FIG. 7, the resultant structure is soaked in a plate vessel 27 containing a 3% ammonium tartrate aqueous solution with a stainless electrode 26 and then aluminum is oxidized by a conventional anode-oxidation method, thus forming $Al_2O_3$.

The thus-formed oxide layer has a very compact structure and exact composition. Therefore, even if it is exposed to laser light, it undergoes only slight deformation such as a change of refractive index or minor damage due to absorption of energy.

Also, after the anode-oxidation, the initial hemicircular shape is maintained and the oxide layer can still serve as a lens. The metal materials for the anode-oxidation can be titanium (Ti), tantalum (Ta), molybdenum (Mo), chromium (Cr) or nickel (Ni) as well as aluminum (Al).

As shown in FIG. 10, it is a generally well-known optical principle that if parallel beams irradiate a hemicircular microlens, the parallel optical rays are focused at a focal distance f, to form a striped pattern of focused light. Here, f=r/n−l where n represents a refractive index of the microlens manufactured by the anode-oxidation, r represents a radius curvature, and l represents the refractive index of air.

Also, with respect to the width, thickness and radius curvature of the microlens, the following equation is established by a simple trigonometric function:

$$r^2=(d/2)^2+(r-t)^2$$

where r=t/2+d$^2$/8t.

From the above equation, it is known that a wide and shallow microlens has a large radius curvature and a long focal distance. In order to prevent laser beams from penetrating the thus-formed lens array, a light-blocking layer 23 is formed and a dielectric anti-reflection coating is performed on the opposite plane, to complete a mask. The light-blocking layer 23 is formed using at least one material selected from the highly reflective metal group consisting of Al, Cr, Mo and Ta and a dielectric group consisting of $SiO_2$, $TiO_2$, ZnS, $MF_2$, $ThF_4$ and $ZrO_2$.

When a polyimide orientation layer is manufactured by a laser beam ablation, a substrate is installed on an electrically driven X-Y stage and irradiated with an excimer laser beam. Thereafter, this process is repeated several times on the substrate while moving the stage by an appropriate distance. Then, grooves having a desired width can be formed on the polyimide orientation layer.

Figure 11:
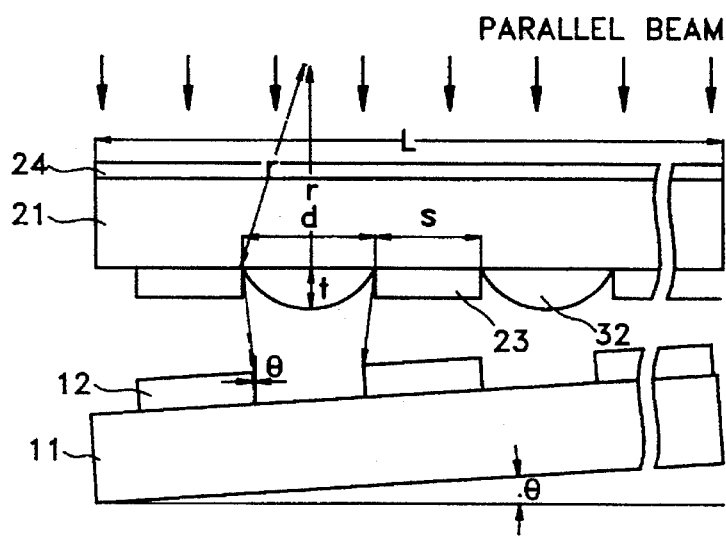
FIG. 11 is a cross-sectional view showing the method for irradiating a laser beam with a substrate tilted when forming the orientation layer according to the present invention.

Also, as shown in FIG. 11, if the excimer laser beams irradiate the substrate while tilted at a specific angle θ, a θ-tilted polyimide orientation layer can be formed, thereby enabling to adjust the orientation of liquid crystal easily by the polyimide orientation layer.

Figure 12:
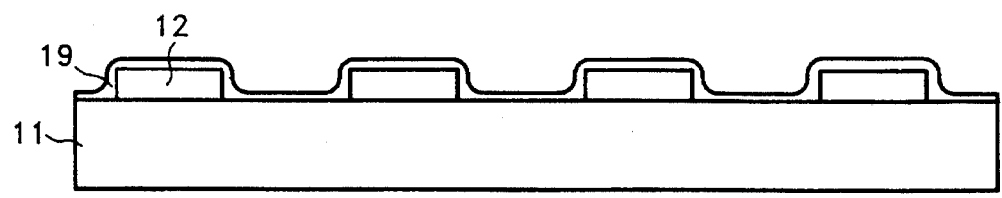
FIG. 12 is a cross-sectional view of the liquid crystal orientation layer completed by further coating a polyimide.

Particularly, as shown in FIG. 12, after forming the polyimide orientation layer, polyimide is additionally coated to then adjust the depth and width of grooves to within 100 Å.

As described above, the orientation layer according to the present invention, the manufacturing method and apparatus therefor and the mask in the apparatus has advantages in that, static electricity is not generated by ablating the coated polyimide using the mask having a hemicircular microlens array for focusing the parallel beams of the excimer laser into striped light, so that a thin-film transistor is not damaged. Also, since a pulse wave having a short wavelength is used as the light source, the manufacturing process is fast, thereby improving productivity. Further, the same manufacturing process is repeatedly performed on a substrate without limitation in the substrate size, for application to very large substrates.

In addition, since the hemicircular microlens of a mask can be variably designed and manufactured, the depth and width of grooves of the orientation layer can be easily adjusted. Also, when manufacturing the orientation layer, by tilting the substrate or overlaying polyimide on the manufactured orientation layer, the depth and width of grooves can be well controlled.

What is claimed is:

1. A method for forming an orientation layer, comprising the steps of:

coating an orientation material in a predetermined thickness on a transparent substrate; and forming a striped orientation layer such that a plurality of striped layers are simultaneously formed in parallel at a predetermined distance by evaporating exposed portions of said orientation layer by focusing striped light from a mask having a hemicircular microlens array onto said orientation layer.

2. A method for forming an orientation layer as claimed in claim 1, wherein said striped orientation layer is formed by tilting said substrate and orientation layer at a predetermined angle.

3. A method for forming an orientation layer as claimed in claim 1, wherein after forming said striped orientation layer, orientation material is coated on the surface of said substrate to adjust the depth and width of grooves formed on said substrate.

4. A method for forming an orientation layer, comprising the steps of:

coating an orientation material in a predetermined thickness on a transparent substrate; and forming a striped orientation layer such that a plurality of striped layers are formed in parallel at a predetermined distance by evaporating exposed portions of said orientation layer by focusing striped light from a mask having a hemicircular microlens array onto said orientation layer;

wherein after forming said striped orientation layer, orientation material is coated on the surface of said substrate to adjust the depth and width of grooves formed on said substrate.

* * * * *